United States Patent
Sowa et al.

(10) Patent No.: US 8,018,511 B2
(45) Date of Patent: Sep. 13, 2011

(54) SOLID-STATE IMAGING DEVICE

(75) Inventors: Takeshi Sowa, Kyoto (JP); Kunihiko Hara, Osaka (JP); Makoto Inagaki, Kyoto (JP); Yoshiyuki Matsunaga, Kyoto (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 12/161,612

(22) PCT Filed: Oct. 24, 2006

(86) PCT No.: PCT/JP2006/321116
§ 371 (c)(1),
(2), (4) Date: Jul. 21, 2008

(87) PCT Pub. No.: WO2007/086175
PCT Pub. Date: Aug. 2, 2007

(65) Prior Publication Data
US 2009/0021625 A1    Jan. 22, 2009

(30) Foreign Application Priority Data
Jan. 30, 2006   (JP) .................................. 2006-020798

(51) Int. Cl.
*H04N 3/14* (2006.01)
*H04N 5/335* (2011.01)

(52) U.S. Cl. ........ 348/294; 348/297; 348/298; 348/302; 348/312

(58) Field of Classification Search .......... 348/294–324; 250/208.1; 257/290–292
See application file for complete search history.

(56) References Cited

U.S. PATENT DOCUMENTS

| 6,858,827 B2 * | 2/2005 | Sugiyama et al. ......... 250/208.1 |
| 2005/0057680 A1 * | 3/2005 | Agan ............................ 348/362 |

FOREIGN PATENT DOCUMENTS

| JP | 60-154784 | 8/1985 |
| JP | 60154784 A * | 8/1985 |
| JP | 04-061573 | 2/1992 |
| JP | 08-111821 | 4/1996 |
| JP | 10-191174 | 7/1998 |
| JP | 11-355662 | 12/1999 |
| JP | 2000-324397 | 11/2000 |
| JP | 2005-005911 | 1/2005 |

* cited by examiner

*Primary Examiner* — Yogesh Aggarwal
(74) *Attorney, Agent, or Firm* — McDermott Will & Emery LLP

(57) ABSTRACT

According to the present invention, as a structure of a pixel section (10), in each of columns from a first to a m-th column, a plurality of pixel signals outputted from a plurality of pixels arranged in a column direction are transmitted, respectively, to a plurality of output signal lines (15*l* to 15*n*) different from each other. Then, a read control and are set control are simultaneously executed on the plurality of pixels.

3 Claims, 7 Drawing Sheets

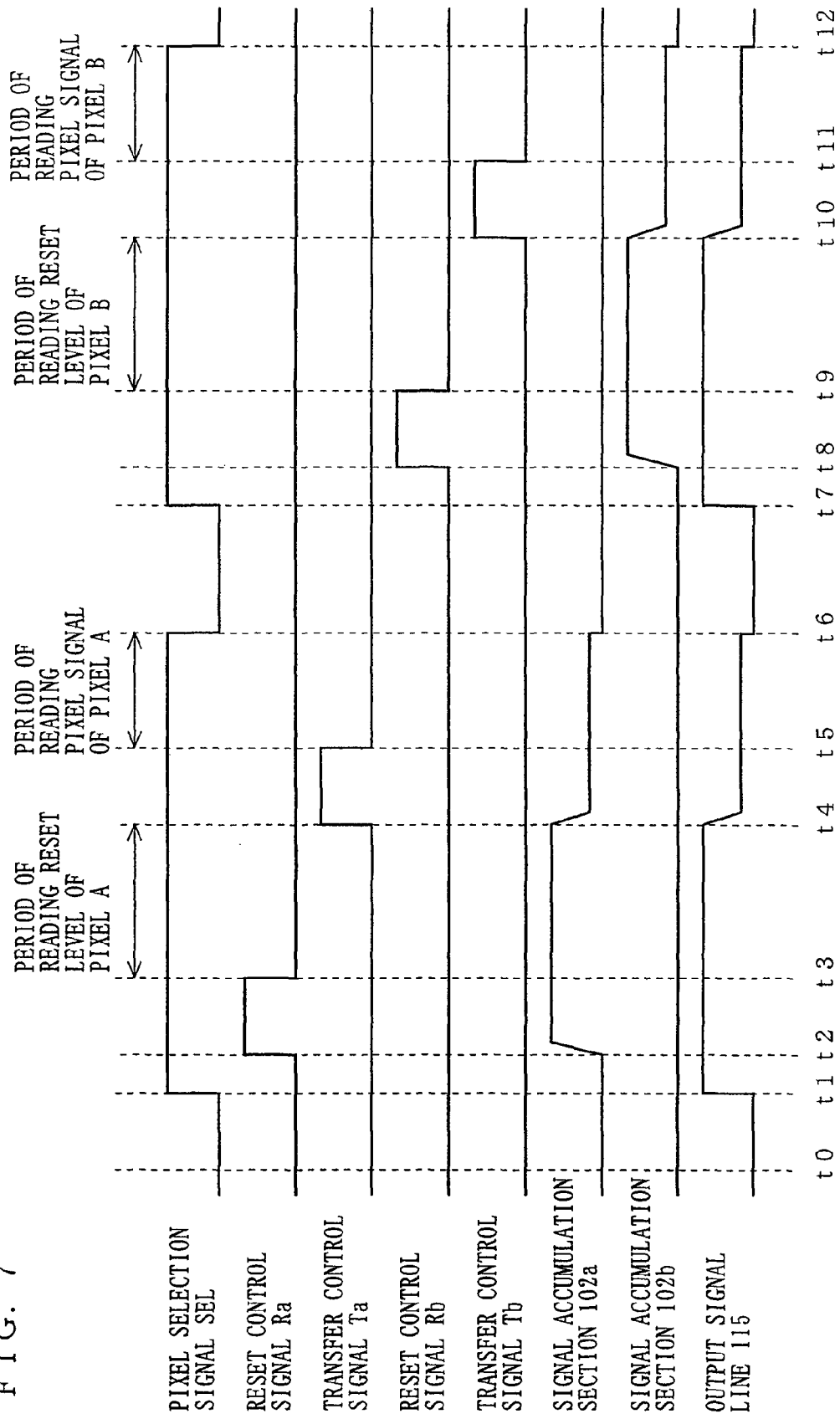

SOLID-STATE IMAGING DEVICE

RELATED APPLICATIONS

This application is the U.S. National Phase under 35 U.S.C. §371 of International Application No. PCT/JP2006/321116, filed on Oct. 24, 2006, which in turn claims the benefit of Japanese Application No. 2006-020798, filed on Jan. 30, 2006, the disclosures of which Applications are incorporated by reference herein.

TECHNICAL FIELD

The present invention relates to a solid-state imaging device capable of increasing the speed of reading electric charges from a pixel.

BACKGROUND ART

Conventionally, for a pixel structure and an operation of a MOS-type image sensor used in a solid-state imaging device, proposed has been a method in which pixels of the MOS-type image sensor are controlled in rows, by sharing a common drain between a reset transistor and an amplify transistor, both of which are included in each pixel (see patent document 1). Hereinafter, a conventional solid-state imaging device disclosed in patent document 1 will be described with reference to FIG. 6 and FIG. 7.

FIG. 6 is a diagram describing a detailed circuit structure of a pixel section used in the conventional solid-state imaging device disclosed in patent document 1.

A pixel A comprises a photodiode 111a, a transfer transistor 112a, a reset transistor 113a, and an amplify transistor 114a. A pixel B comprises a photodiode 111b, a transfer transistor 112b, a reset transistor 113b, and an amplify transistor 114b. Each of the photodiodes 111a and 111b generates signal electric charges. To gates of the transfer transistors 112a and 112b, transfer control signals Ta and Tb are supplied, respectively, and the transfer transistors 112a and 112b transfer (read) the signal electric charges generated in the photodiodes 111a and 111b to the signal accumulation sections 102a and 102b in accordance with the transfer control signals Ta and Tb, respectively. To gates of the reset transistors 113a and 113b, reset control signals Ra and Rb are supplied, respectively, and the reset transistors 113a and 113b reset the signal electric charges accumulated in the signal accumulation sections 102a and 102b in accordance with the reset control signals Ra and Rb, respectively. The amplify transistors 114a and 114b amplify the signal electric charges accumulated in the signal accumulation sections 102a and 102b, respectively, so as to be outputted to a common output signal line 115. A constant current source 116 is connected to the output signal line 115. Furthermore, a pixel selection signal SEL supplied to a drain of each of the amplify transistors 114a and 114b outputs a power source voltage level or a ground level.

FIG. 7 is a timing chart describing an operation of the conventional solid-state imaging device. At a timing of time t0 shown in FIG. 7, all levels of the pixel selection signal SEL, the reset control signals Ra and Rb, the transfer control signals Ta and Tb are ground levels, and both of the pixels A and B are unselected.

At a timing of time t1, the level of the pixel selection signal SEL becomes a power source voltage level. And, a level of the output signal line 115 becomes the power source voltage level. Next, at a timing of time t2, the level of the reset control signal Ra becomes the power source voltage level. Accordingly, the reset transistor 113a is turned on. At this timing, the pixel A is selected. Then, at a timing of time t3, the level of the reset control signal Ra becomes the ground level. Accordingly, the reset transistor 113a is turned off. A period from the time t3 to the time t4 is a period of reading a reset level of the pixel A.

Next, at a timing of time t4, the level of the transfer control signal Ta becomes the power source voltage level. Accordingly, the transfer transistor 112a is turned on. Then, at a timing of time t5, the level of the transfer control signal Ta becomes the ground level. Accordingly, the transfer transistor 112a is turned off. During a period from the time t4 to the time t5, the electric charges are transferred from the photodiode 111a to the signal accumulation section 102a, thereby causing a potential level of the signal accumulation section 102a to decrease from a potential level of the pixel selection signal SEL by a potential level of the photodiode 111a. Accordingly, the electric charges fluctuated as described above are outputted to the output signal line 115 via the amplify transistor 114a. As a result, a level of the electric charges fluctuated as described above is read as a level of a pixel signal of the pixel A. A period from the time t5 to the time t6 is a period of reading the pixel signal of the pixel A.

Next, at a timing of time t6, the level of the pixel selection signal SEL becomes the ground level. Accordingly, both the pixels A and B become unselected again. Thereafter, at a timing of time t7, the level of the pixel selection signal SEL becomes the power source voltage level. And, the level of the output signal line 115 becomes the power source voltage level. Next, at a timing of time t8, the level of the reset control signal Rb becomes the power source voltage level. Accordingly, the reset transistor 113b is turned on. At this timing, the pixel B is selected. Next, at a timing of time t9, the level of the reset control signal Rb becomes the ground level. Accordingly, the reset transistor 113b is turned off. A period from the time t9 to the time t10 is a period of reading a reset level of the pixel B.

Next, at a timing of time t10, the level of the transfer control signal Tb becomes the power source voltage level. Accordingly, the transfer transistor 112b is turned on. Then, at a timing of time t11, the level of the transfer control signal Tb becomes the ground level. Accordingly, the transfer transistor 112b is turned off. During a period from the time t11 to the time t12, the electric charges are transferred from the photodiode 111b to the signal accumulation section 102b, thereby causing a potential level of the signal accumulation section 102b to decrease from the potential level of the pixel selection signal SEL by a potential level of the photodiode 111b. Accordingly, the electric charges fluctuated as described above are outputted to the output signal line 115 via the amplify transistor 114b. As a result, a level of the electric charges fluctuated as described above is read as a level of a pixel signal of the pixel B. A period from the time t11 to the time t12 is a period of reading the pixel signal of the pixel B.

As described above, the conventional solid-state imaging device can execute read operations of selecting pixels, resetting the pixels, and transferring electric charges from photodiodes. Furthermore, such read operations can be executed in rows.

[Patent document 1] Japanese Laid-Open Patent Publication No. 2005-5911

DISCLOSURE OF THE INVENTION

Problems to be Solved by the Invention

A structure of the conventional solid-state imaging device mentioned above allows a read process to be collectively executed, in rows, on pixel signals outputted from pixels arranged in a row direction (horizontal direction). However, it is impossible to collectively execute the read process, in columns, on pixel signals outputted from pixels arranged in a column direction (vertical direction). Therefore, a series of pixel read operations need to be repeated the number of times equivalent to the number of a plurality of pixels arranged in the column direction. Thus, the conventional solid-state imaging device has a problem that the more pixels the device contains, the more time it requires to read pixel signals of all the pixels.

Therefore, an object of the present invention is to provide a solid-state imaging device capable of collectively reading, in columns, pixel signals of a plurality of pixels even arranged in the column direction (vertical direction) at high-speed without causing the read pixel signals to collide with each other on an output signal line.

Solution to the Problems

The present invention is directed to a solid-state imaging device which reads, in a predetermined order, signal electric charges generated in a plurality of pixels arranged in a matrix and outputs the read electric charges. In order to attain the object mentioned above, each pixel comprises: a photodiode for generating the signal electric charges; a transfer transistor for transferring the signal electric charges generated in the photodiode to a signal accumulation section in accordance with a transfer control signal; a reset transistor for controlling a potential of the signal accumulation section in accordance with a reset control signal; and an amplify transistor for amplifying the signal electric charges having been transferred to the signal accumulation section and outputting, as a pixel signal, the amplified signal electric charges to an output signal line, wherein in each column, outputs of n pixels arranged in a column direction (vertical direction) are respectively connected to a plurality of the 1 (n≧1) output signal lines different from each other.

Preferably, all or a portion of a plurality of the transfer control signals respectively supplied to the plurality of pixels are the same, and all or a portion of a plurality of the reset control signals respectively supplied to the plurality of pixels are the same. Furthermore, a signal processing is preferably executed at the same timing on a plurality of the pixel signals, whose number is equal to or greater than n, and which are outputted from the plurality of pixels, after passing through a plurality of the output signal lines, whose number is equal to or greater than 1 (n≧1), and which are different from each other.

Effect of the Invention

As described above, by using a structure in which, in each column, a plurality of pixel signals outputted from a plurality of pixels arranged in the column direction (vertical direction) are outputted, respectively, to a plurality of output signal lines different from each other, the read control and the reset control are simultaneously executed on the plurality of pixels. Thus, it becomes possible to transmit the pixel signals read from the pixels to the signal processing circuit at high speed without colliding with each other on the output signal lines.

BRIEF DESCRIPTION OF THE DRAWINGS

FIG. 7 is a timing chart describing an operation of the conventional solid-state imaging device.

Figure 1:
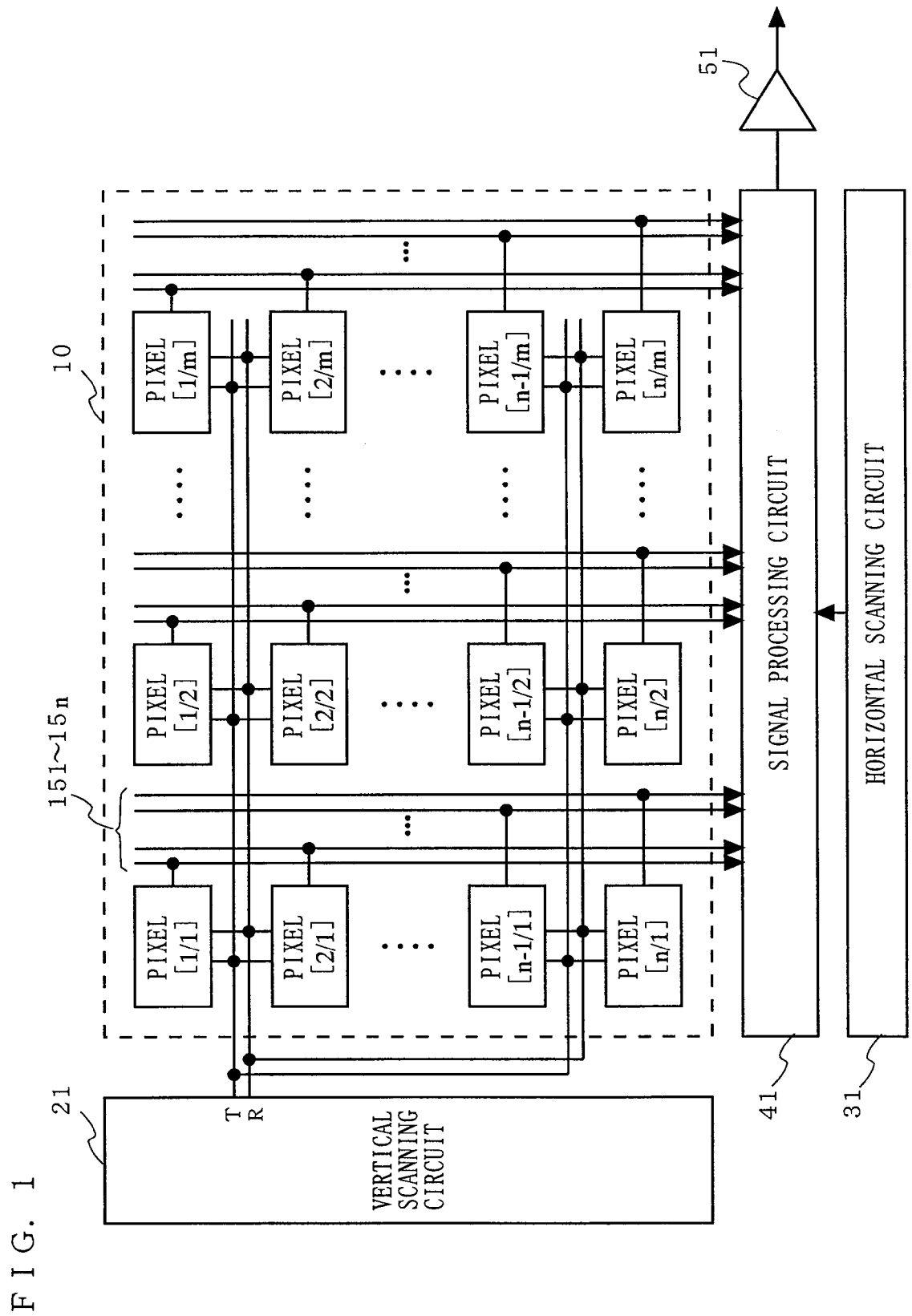
FIG. 1 is a diagram illustrating a schematic structure of a solid-state imaging device according to a first embodiment of the present invention.

DESCRIPTION OF THE REFERENCE CHARACTERS 10 pixel section
21, 22, 121 vertical scanning circuit
31, 32 horizontal scanning circuit
41, 42 signal processing circuit
51, 52 output amplifier
15*l*-15*n*, 15*a*, 15*b*, 115 output signal line
11*a*, 11*b*, 111*a*, 111*b* photodiode
12*a*, 12*b*, 112*a*, 112*b* transfer transistor
13*a*, 13*b*, 113*a*, 113*b* reset transistor
14*a*, 14*b*, 114*a*, 114*b* amplify transistor
16*a*, 16*b*, 116 constant current source
2*a*, 2*b*, 102*a*, 102*b* signal accumulation section
T, Ta, Tb transfer control signal
R, Ra, Tb reset control signal
SEL pixel selection signal

BEST MODE FOR CARRYING OUT THE INVENTION

First Embodiment

FIG. 1 is a diagram illustrating a schematic structure of a solid-state imaging device according to a first embodiment of the present invention. In FIG. 1, the solid-state imaging device according to the first embodiment comprises a pixel section 10, a vertical scanning circuit 21, a horizontal scanning circuit 31, a signal processing circuit 41, and an output amplifier 51. The pixel section 10 includes a plurality of pixels [1/1] to [n/m] arranged in two dimensions of m rows and n columns. Each of the plurality of pixels [1/1] to [n/m] is typically a MOS-type image sensor. The vertical scanning circuit 21 executes a reset process and a transfer (read) process on the plurality of pixels [1/1] to [n/m] by using a reset control signal R and a transfer control signal T. The horizontal scanning circuit 31 selects a column of pixels to be read from the pixel section 10. The signal processing circuit 41 executes a necessary process (a noise removing process, for example) on pixel signals, in each column, outputted from the pixel section 10 so as to be sequentially outputted to the output amplifier 51. The output amplifier 51 amplifies each of the pixel signals outputted from the signal processing circuit 41 and outputs each of the amplified pixel signals.

As a feature of the solid-state imaging device of the present invention, in each of columns (a first to m-th columns), n pixel signals (photoelectric conversion signals) outputted from n pixels arranged in the column direction (vertical direction) are outputted, respectively, to n output signal lines 15*l* to 15*n* different from each other. Hereinafter, this feature will be described in detail with reference to FIG. 2 and FIG. 3.

Figure 2:
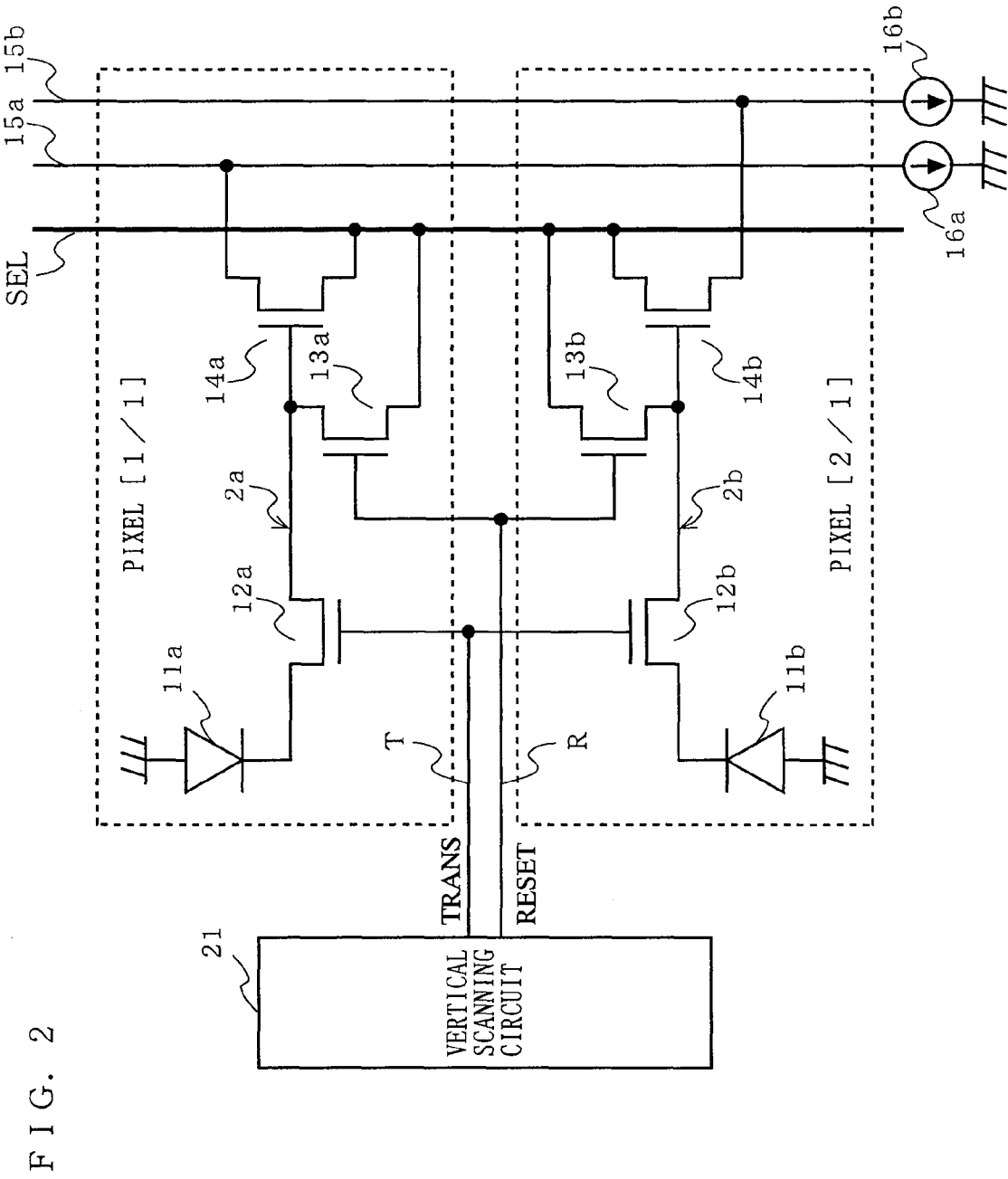
FIG. 2 is a diagram describing a detailed circuit structure of a pixel section 10 shown in FIG. 1.

FIG. 2 is a diagram describing detailed circuit structures of a pixel [1/1] and a pixel [2/1] included in the pixel section 10 shown in FIG. 1.

The pixel [1/1] comprises a photodiode 11a, a transfer transistor 12a, a reset transistor 13a, and an amplify transistor 14a. The pixel [2/1] comprises a photodiode 11b, a transfer transistor 12b, a reset transistor 13b, and an amplify transistor 14b. Each of the photodiodes 11a and 11b generates signal electric charges. To a gate of each of the transfer transistors 12a and 12b, the same transfer control signal T is supplied, and the transfer transistors 12a and 12b transfer (read) the signal electric charges generated in the photodiodes 11a and 11b to the signal accumulation sections 2a and 2b, respectively, in accordance with the transfer control signal T. To a gate of each of the reset transistors 13a and 13b, the same reset control signal R is supplied, and the reset transistors 13a and 13b reset the signal electric charges accumulated in the signal accumulation sections 2a and 2b, respectively, in accordance with the reset control signal R. The amplify transistors 14a and 14b amplify the signal electric charges accumulated in the signal accumulation sections 2a and 2b, respectively, so as to be outputted. An output of the amplify transistor 14a is connected to the output signal line 15a, and an output of the amplify transistor 14b is connected to the output signal line 15b. Constant current sources 16a and 16b are connected to the output signal lines 15a and 15b, respectively. Furthermore, a pixel selection signal SEL supplied to a drain of each of the amplify transistors 14a and 14b outputs a power source voltage level or a ground level.

Figure 3:
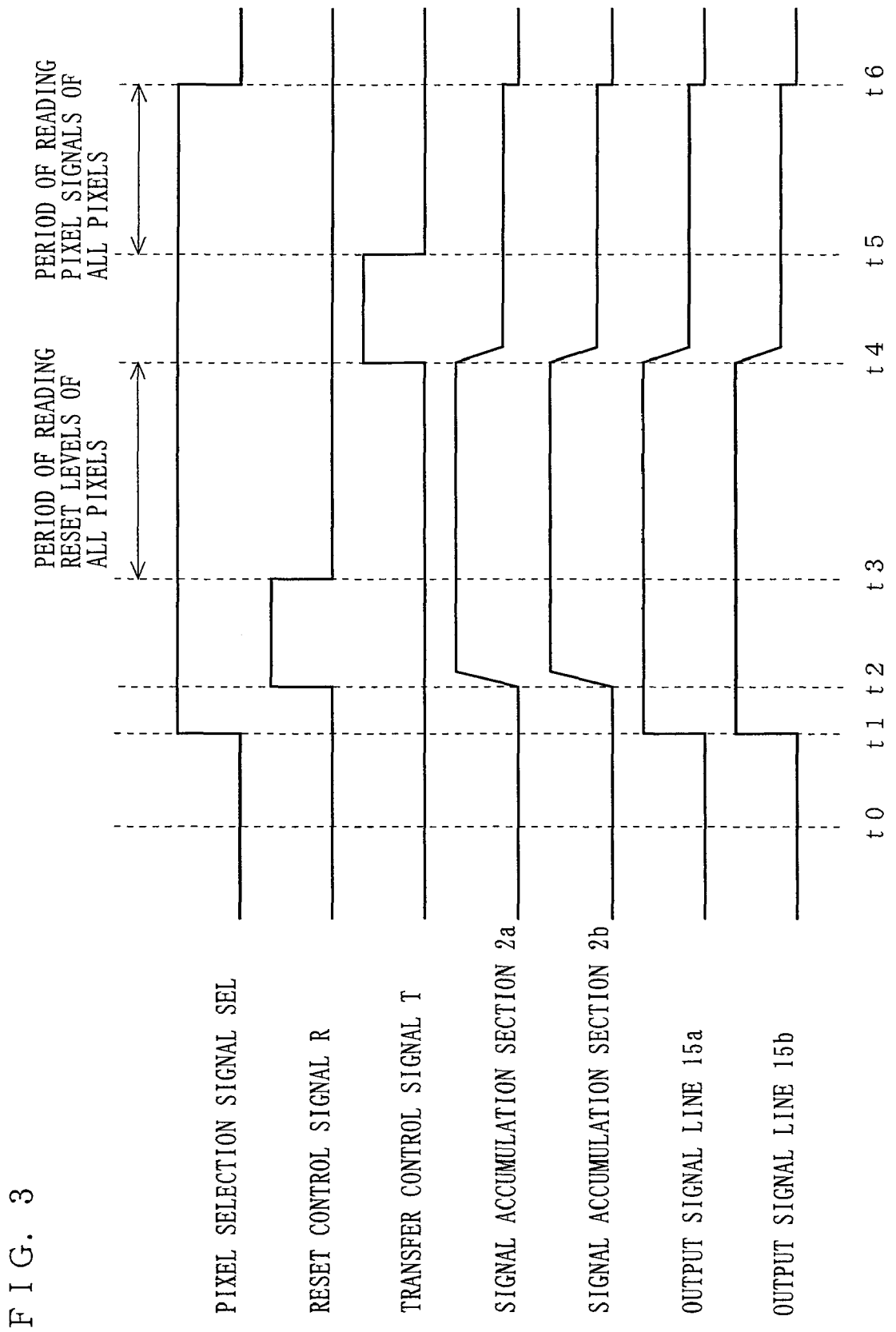
FIG. 3 is a timing chart describing an operation of the solid-state imaging device according to the first embodiment.

FIG. 3 is a timing chart describing an operation of the solid-state imaging device according to the first embodiment of the present invention. At a timing of time t0 shown in FIG. 3, all levels of the pixel selection signal SEL, the reset control signal R and the transfer control signal T are the ground level, and all the pixels included in the pixel section 10 are unselected.

At a timing of time t1, the level of the pixel selection signal SEL becomes the power source voltage level. And, levels of the output signal lines 15a and 15b become the power source voltage level. Next, at a timing of time t2, the level of the reset control signal R becomes the power source voltage level. Accordingly, the reset transistors 13a and 13b are turned on. At this timing, the pixel [1/1] and the pixel [2/1] are selected. Next, at a timing of time t3, the level of the reset control signal R becomes the ground level. Accordingly, the reset transistors 13a and 13b are turned off. A period from the time t3 to the time t4 is a period of reading reset levels of all the pixels.

Then, at a timing of time t4, the level of the transfer control signal T becomes the power source voltage level. Accordingly, the transfer transistors 12a and 12b are turned on. Next, at a timing of time t5, the level of the transfer control signal T becomes the ground level. Accordingly, the transfer transistors 12a and 12b are turned off. During a period from the time t4 to the time t5, the electric charges are transferred from the photodiode 11a and the photodiode 11b to the signal accumulation section 2a and the signal accumulation section 2b, respectively, thereby causing a potential level of each of the signal accumulation sections 2a and 2b to decrease from a potential level of the pixel selection signal SEL by a potential level of each of the photodiode 11a and 11b. Accordingly, the electric charges fluctuated as described above are outputted to the output signal lines 15a and 15b of the respective amplify transistor 14a and 14b. As a result, a level of the electric charges fluctuated as described above is read as a level of a pixel signal of each of the pixel [1/1] and the pixel [2/1]. A period from the time t5 to the time t6 is a period of reading the pixel signals of all the pixels.

As described above, by executing a reset operation and a transfer operation once, it becomes possible to operate the signal electric charges generated in the photodiodes 11a and 11b of the respective pixel [1/1] and the pixel [2/1].

As described above, according to the solid-state imaging device of the first embodiment of the present invention, by using a structure in which, in each column, a plurality of pixel signals outputted from a plurality of pixels arranged in the column direction (vertical direction) are outputted, respectively, to a plurality of output signal lines different from each other, the read control and the reset control are simultaneously executed on the plurality of pixels. Thus, it becomes possible to transmit the pixel signals read from the pixels to the signal processing circuit at high speed without colliding with each other on the output signal lines.

Figure 4:
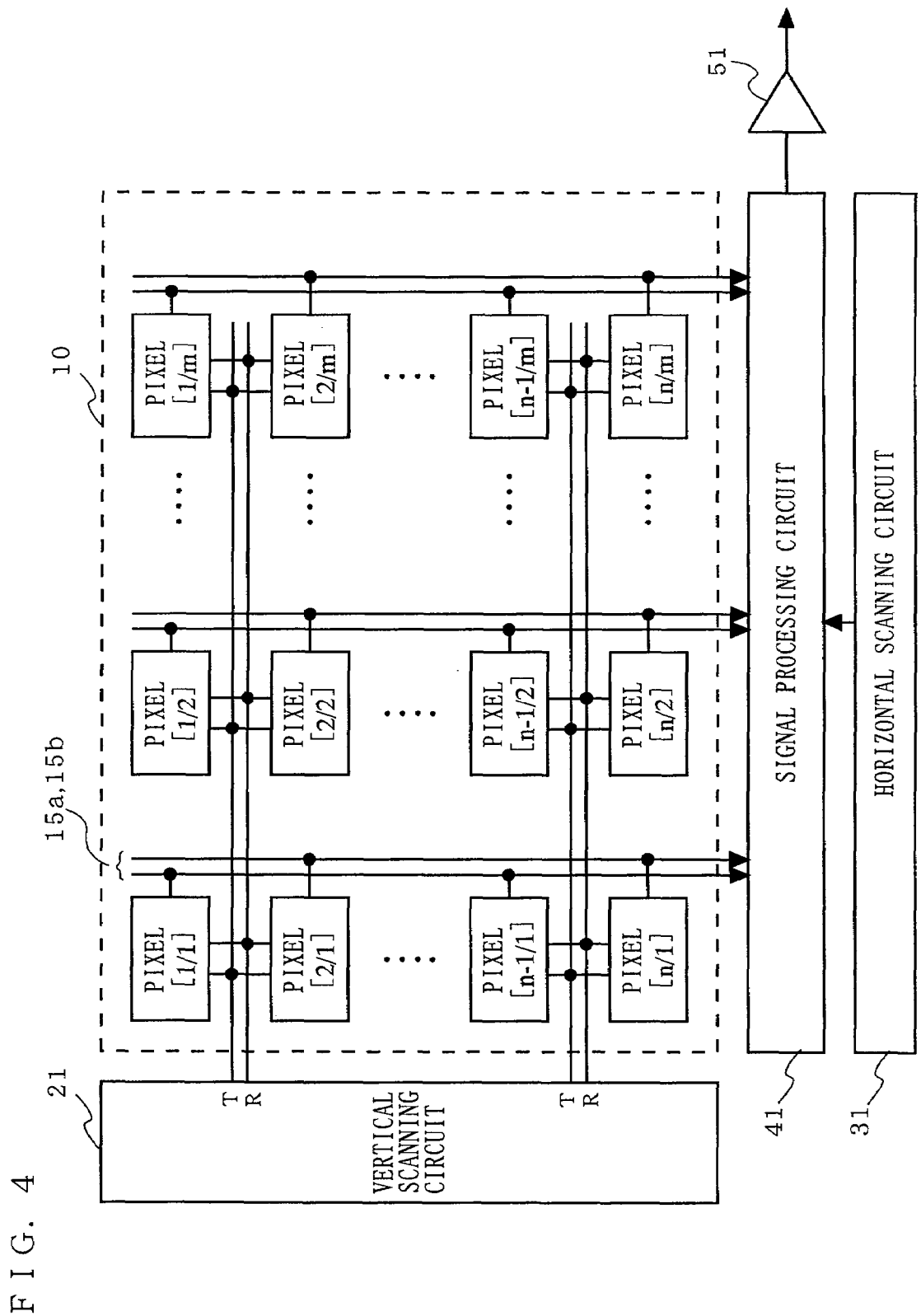
FIG. 4 is a diagram illustrating another schematic structure of the solid-state imaging device according to the first embodiment of the present invention.

Note that the present embodiment illustrates an exemplary structure in which the n pixel signals outputted from the n pixels arranged in the column direction (vertical direction) are outputted, respectively, to the n output signal lines 15a to 15n different from each other. However, all of the n pixels may not be connected to individual output signal lines. For example, as shown in FIG. 4, by using a structure containing n pixels wired in such a manner as to be divided into pairs, each having two pixels symmetrical to each other, the read control and reset control may be executed on each of the pairs. If using such a method, only two output signal lines 15a and 15b are required for each column. Therefore, the size of the pixel section 10 can be decreased.

Second Embodiment

As shown in FIG. 4, in the case where the n pixels are wired in such a manner as to be divided into pairs, each having two pixels symmetrical to each other, and the two output signal lines 15a and 15b are provided for each column, the solid-state imaging device may have a structure to be described below.

Figure 5:
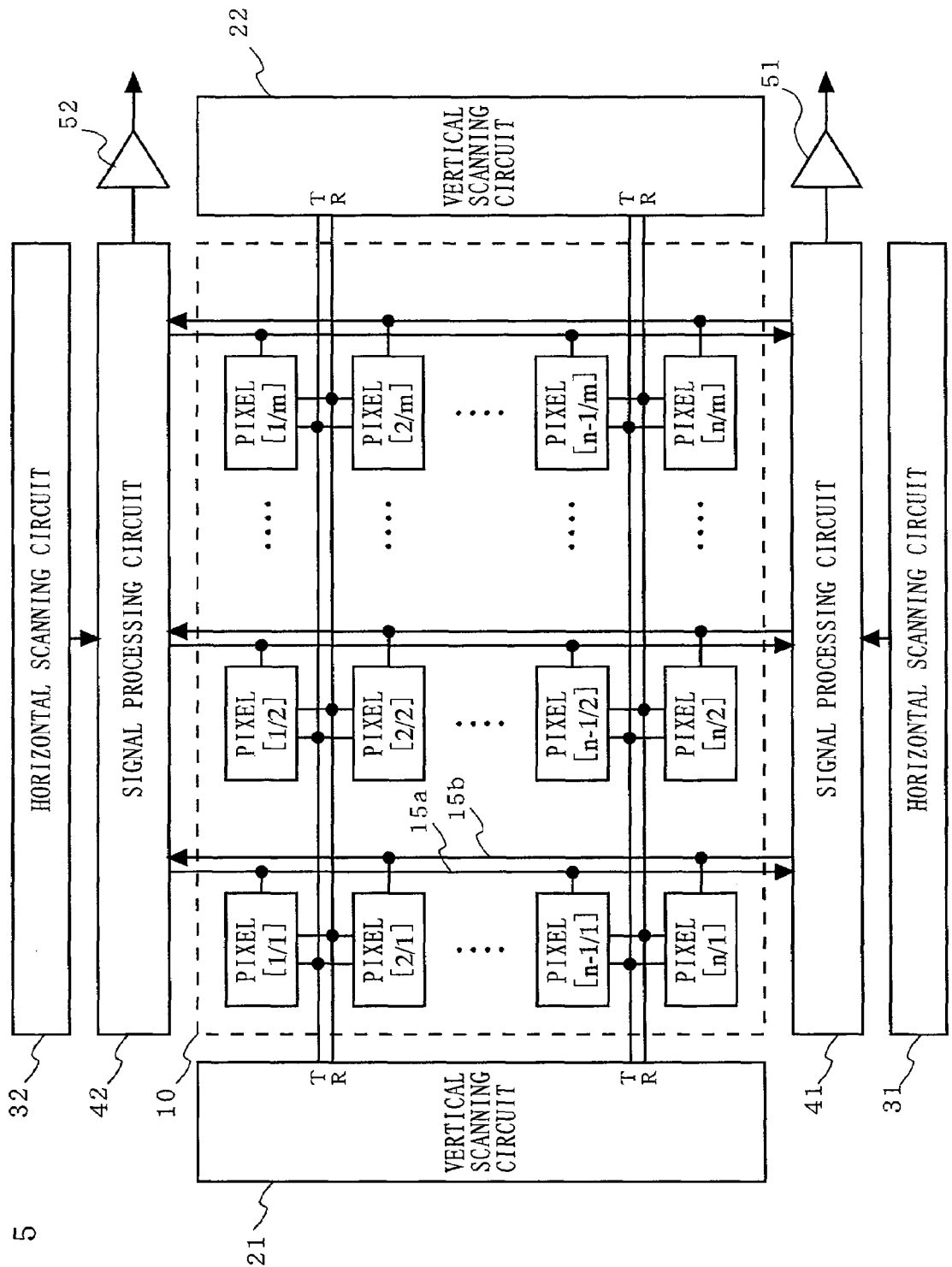
FIG. 5 is a diagram illustrating a schematic structure of the solid-state imaging device according to a second embodiment of the present invention.
Figure 6:
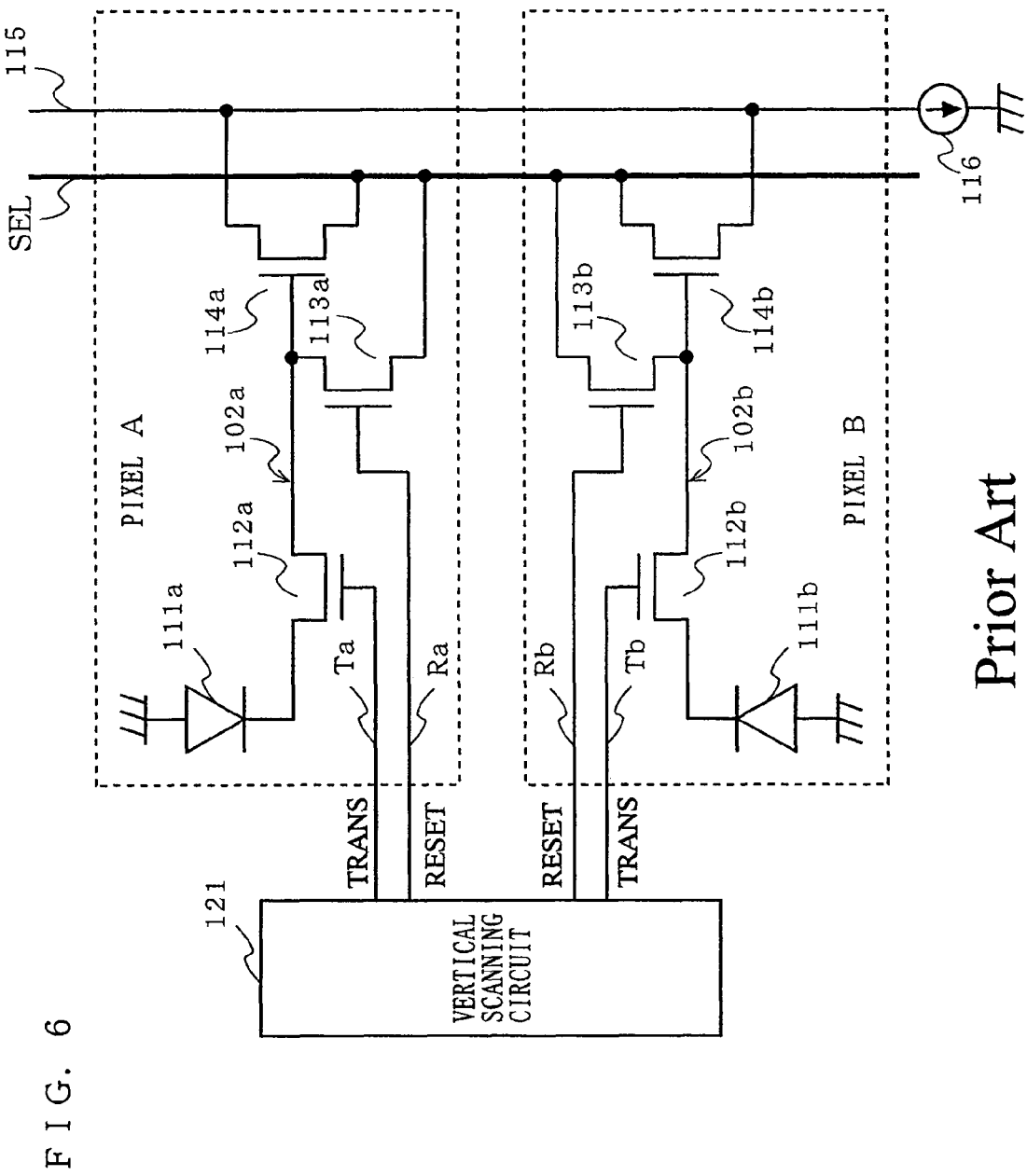
FIG. 6 is a diagram describing a detailed circuit structure of the pixel section 10 of a conventional solid-state imaging device.

FIG. 5 is a diagram illustrating a schematic structure of the solid-state imaging device according to a second embodiment of the present invention. In FIG. 5, the solid-state imaging device according to the second embodiment comprises the pixel section 10, two vertical scanning circuits 21 and 22, two horizontal scanning circuits 31 and 32, two signal processing circuits 41 and 42, and two output amplifiers 51 and 52.

The vertical scanning circuit 21, the horizontal scanning circuit 31, the signal processing circuit 41, and the output amplifier 51 have been already described in the first embodiment. Structures and operations of the vertical scanning circuit 22, the horizontal scanning circuit 32, the signal processing circuit 42 and the output amplifier 52 are the same as those of the vertical scanning circuit 21, the horizontal scanning circuit 31, the signal processing circuit 41, and the output amplifier 51, respectively, and the above components having the same structure operate at the same timing.

For example, a pixel signal of the pixel [1/1] to be outputted to the output signal line 15a in response to the transfer control signal T is outputted to the output amplifier 51 via the signal processing circuit 41 in accordance with a selected operation of the horizontal scanning circuit 31. On the other hand, a pixel signal of the pixel [2/1] to be outputted to the output signal line 15b in response to the transfer control signal T is outputted to the output amplifier 52 via the signal processing circuit 42 at the same timing as the pixel signal of the pixel [1/1] in accordance with a selected operation of the horizontal scanning circuit 32.

As described above, the solid-state imaging device according to the second embodiment of the present invention causes each pixel block having pixels symmetrical to each other to be driven in a synchronized manner. Therefore, the pixel signals can be read at high speed without being blended with each other.

INDUSTRIAL APPLICABILITY

The present invention is applicable to a solid-state imaging device or the like, and is particularly applicable when electrical charges generated in a photodiode are desired to read at high speed or the like.

The invention claimed is:

1. A solid-state imaging device which reads, in a predetermined order, signal electric charges generated in a plurality of pixels arranged in a matrix and outputs the read electric charges, said solid-state imaging device comprises:
    the plurality of pixels;
    a plurality of horizontal reset control signal lines; and
    a plurality of horizontal transfer control signal lines, wherein
    each pixel comprises:
        a photodiode for generating the signal electric charges;
        a transfer transistor for transferring the signal electric charges generated in the photodiode to a signal accumulation section in accordance with a transfer control signal;
        a reset transistor for controlling a potential of the signal accumulation section in accordance with a reset control signal; and
        an amplify transistor for amplifying the signal electric charges having been transferred to the signal accumulation section and outputting, as a pixel signal, the amplified signal electric charges to one of a plurality of output signal lines, wherein
    in each column, each output of n pixels arranged in a column direction is respectively connected to a different one of the plurality of output signal lines,
    one of the plurality of horizontal reset control signal lines and one of the plurality of horizontal transfer signal lines are disposed between a first row of the plurality of pixels and a second row of the plurality of pixels, where the first row and the second row are adjacent to each other,
    the one of the plurality of horizontal transfer control signal lines is connected to at least one of the transfer transistor of the first row and at least one of the transfer transistor of the second row, and
    the one of the plurality of horizontal reset control signal lines is connected to at least one of the reset transistor of the first row and at least one of the reset transistor of the second row.

2. The solid-state imaging device according to claim 1, wherein
    a signal processing is executed at the same timing on a plurality of the pixel signals, whose number is equal to or greater than n, and which are outputted from the plurality of pixels, after passing through a plurality of the output signal lines, whose number is equal to or greater than n, and which are different from each other.

3. The solid-state imaging device according to claim 1, wherein
    by using a structure in which a plurality of the pixel signals outputted from the plurality of pixels arranged in the column direction (vertical direction) are respectively transmitted to the plurality of output signal lines different from each other, a read control and a reset control are simultaneously executed on the plurality of pixels.

* * * * *